W. H. C. STANFORD.
Pipe-Joints.

No. 157,356. Patented Dec. 1, 1874.

WITNESSES.

INVENTOR.

UNITED STATES PATENT OFFICE.

WALTER H. C. STANFORD, OF LONDON, GREAT BRITAIN.

IMPROVEMENT IN PIPE-JOINTS.

Specification forming part of Letters Patent No. 157,356, dated December 1, 1874; application filed June 3, 1874.

*To all whom it may concern:*

Be it known that I, WALTER HALSTED CORTIS STANFORD, of 3 Westminster Chambers, Victoria Street, London, in the county of Middlesex, in the United Kingdom of Great Britain, have invented Improvements in Pipe-Joints, more especially adapted to stoneware pipes, of which the following is a specification:

This invention relates to the construction of the joints of earthenware, stoneware, or other pipes, in such a manner that when simply placed one in another, they will fit precisely, and maintain their soundness even when laid under water; and consists in making the joint by running or casting a liquid or molten cement on the spigots and in the sockets of the pipes, the required form being obtained by means of male and female molds, the said molds being accurately turned and bored and ground into one another either taper or to a spherical curve.

The turned molds may be economically reproduced by means of plaster-of-paris casts.

When the molds are removed the spigots and sockets thus treated will fit each other with great accuracy, and upon being covered with gas-tar, grease, tallow, paraffine, or other suitable varnish or lubricating material, and inserted the one into the other, the result will be the production of a joint that will stand external and internal pressure and remain absolutely air-tight and water-tight.

The material of which the linings and ferrules, constituting the joints, are made will vary according to the purpose to which the pipes are to be applied; but I prefer, for ordinary use in drainage-works, a cement composed of sulphur, ground stoneware pipes, and so much gas-tar or other elastic material as will prevent the compound from cracking in cooling.

The proportions may be varied according to circumstances.

The joint material may be also made of plaster-of-paris, Roman, Portland cement, or in fact of any cement suitable to the use to which the pipes are intended, the invention not being limited to the materials of which the joints are composed.

Figure 1:
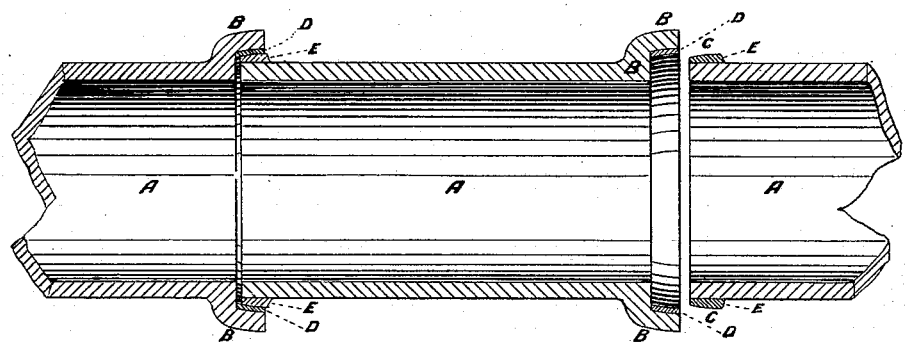
Figure 2:
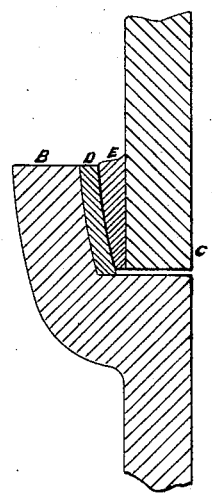
Figure 3:
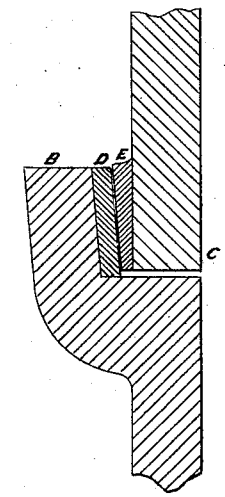

In order that the foregoing may be more easily understood, drawings are attached hereto, of which the following is a description:

Figure 1 represents a pipe and portions of two others, A A A. B B are the socket ends, and C C the spigots, D showing the lining of the socket, and E the ferrule of the spigot. Fig. 2 exhibits, on a larger scale, a portion of a joint, and shows the spherical shape adapted to this size of pipe, by the adoption of which, pipes may be laid to any curve with as much ease and accuracy as those in a straight line, while it also effectually prevents rupture of the joints caused by unequal settlement of the ground in which they are laid. A plain taper joint is depicted in Fig. 3; similar letters referring to the same parts in each of the figures.

I claim—

The lining D and ferrule E, constructed as described, and applied to stoneware or other pipes.

W. H. C. STANFORD.

Witnesses:
 W. H. BENNETT,
 CHAS. V. BENNETT.